Figure 9:
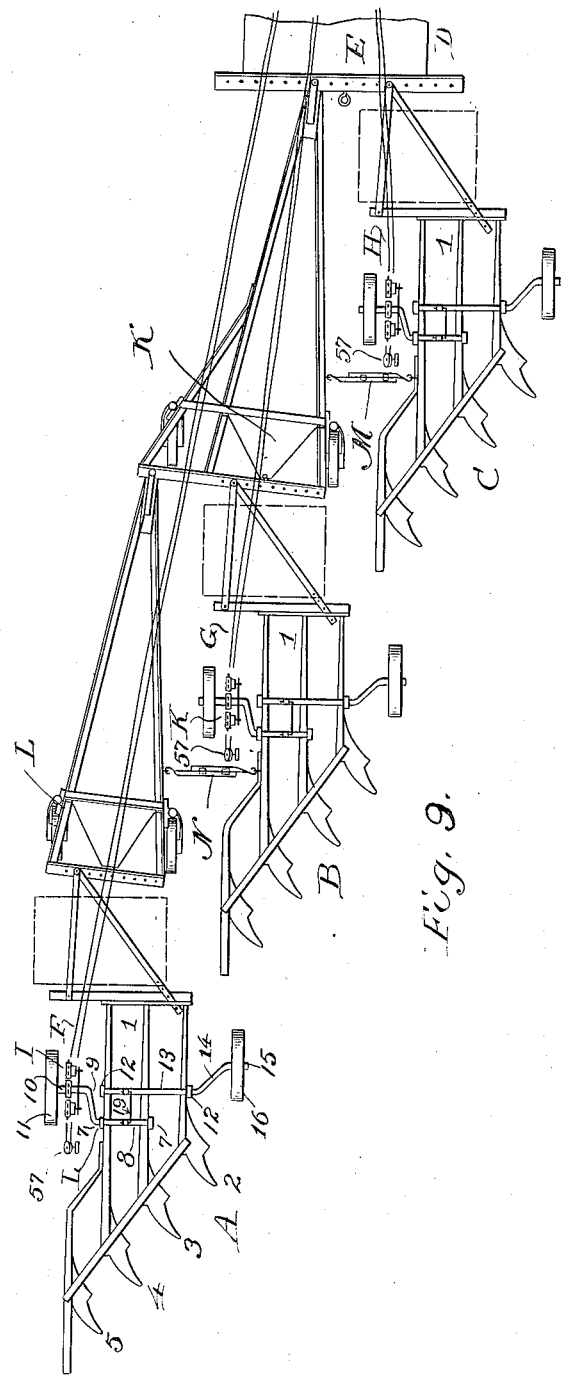

O. F. SMITH & A. C. LINDGREN.
PLOW ADJUSTING MECHANISM.
APPLICATION FILED NOV. 14, 1912.
1,103,543.
Patented July 14, 1914.
5 SHEETS—SHEET 1.
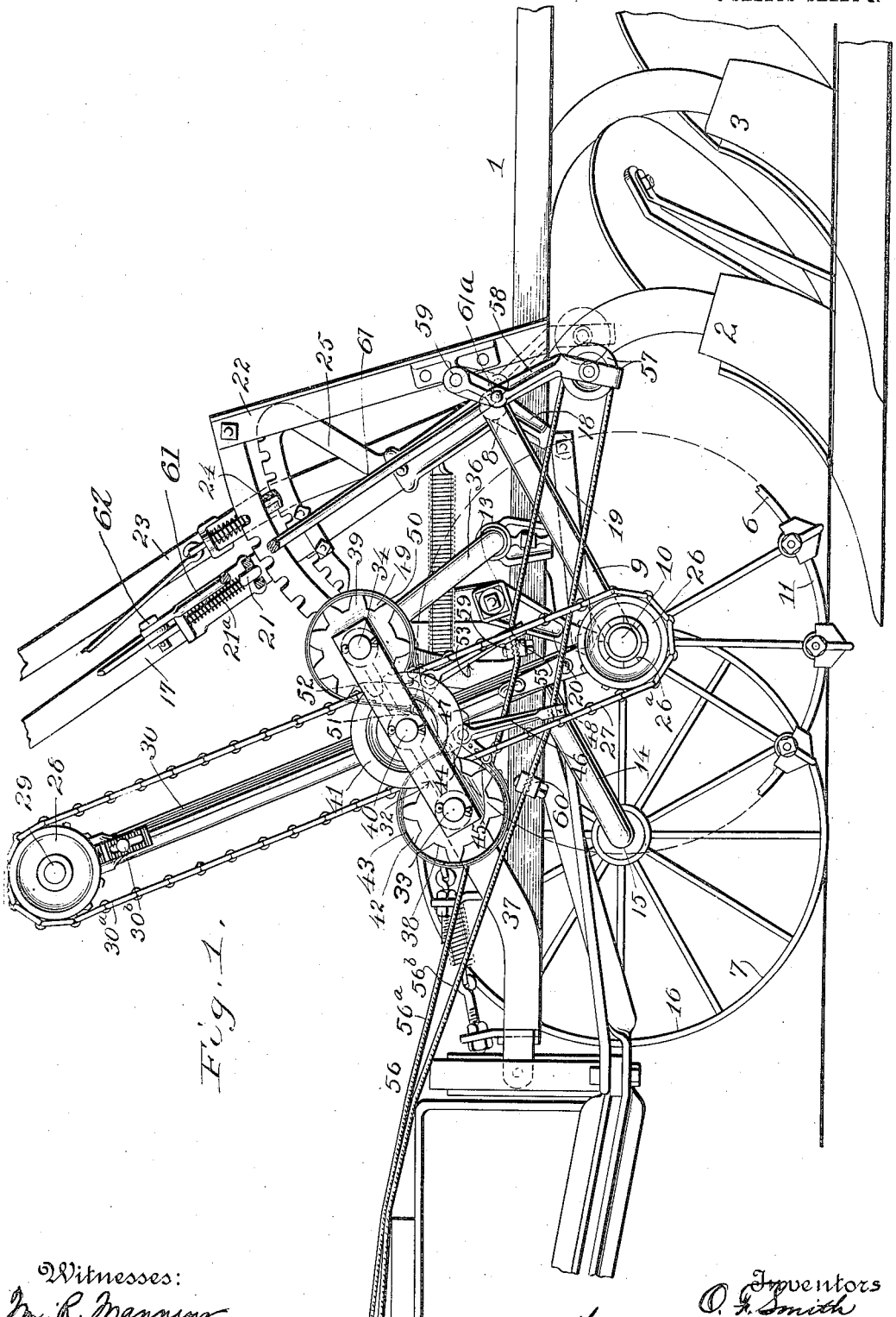

O. F. SMITH & A. C. LINDGREN.
PLOW ADJUSTING MECHANISM.
APPLICATION FILED NOV. 14, 1912.
1,103,543.
Patented July 14, 1914.
5 SHEETS—SHEET 2.
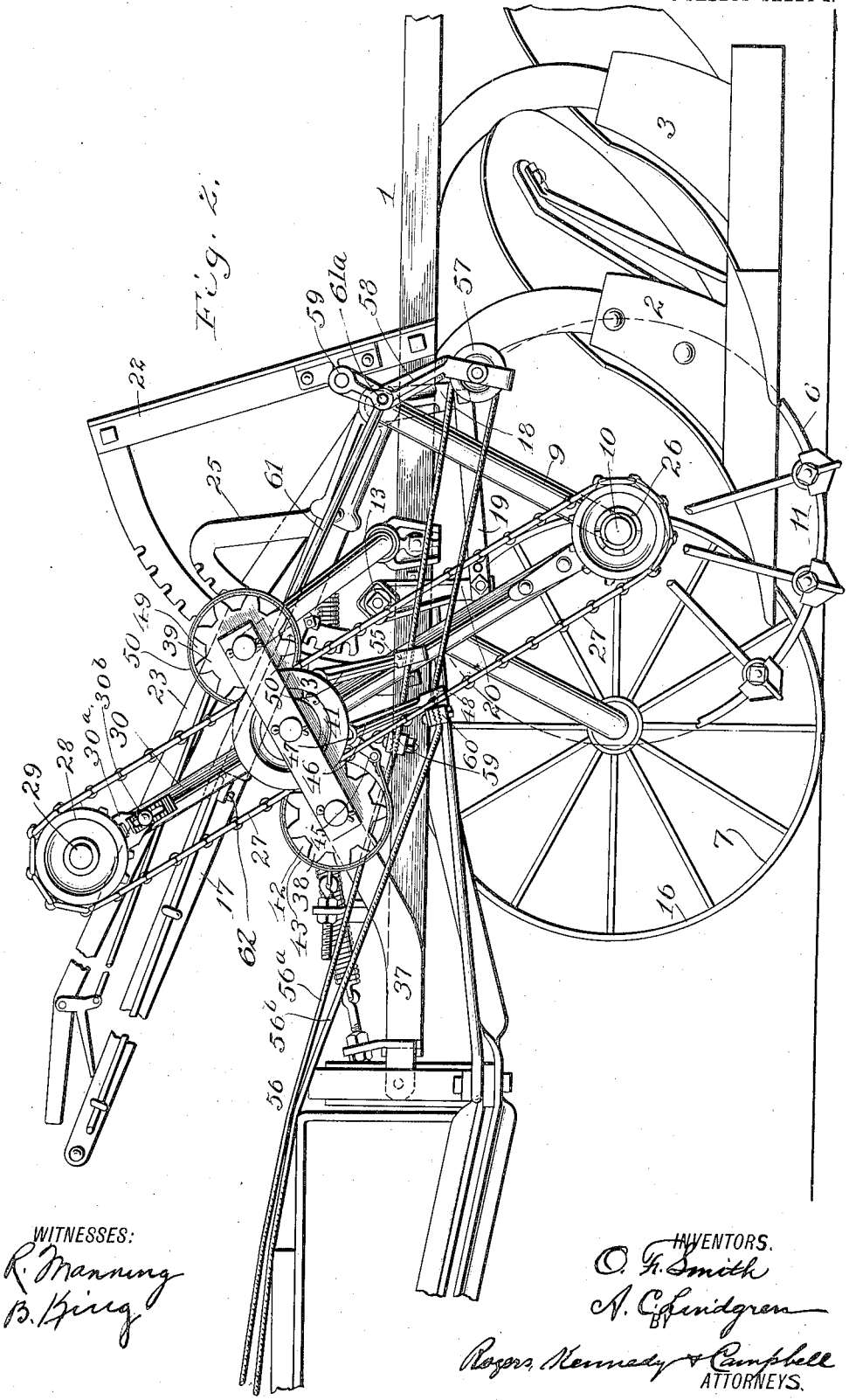

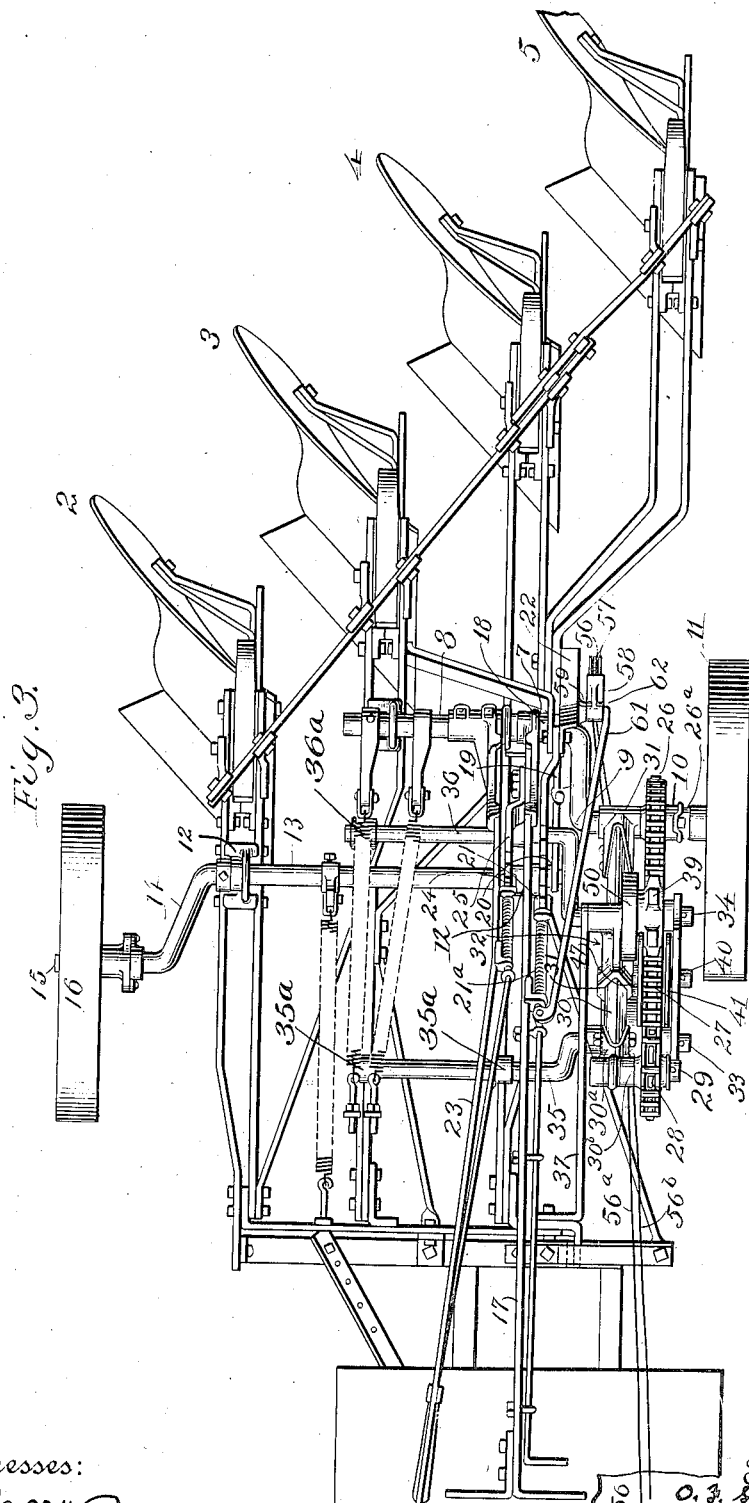

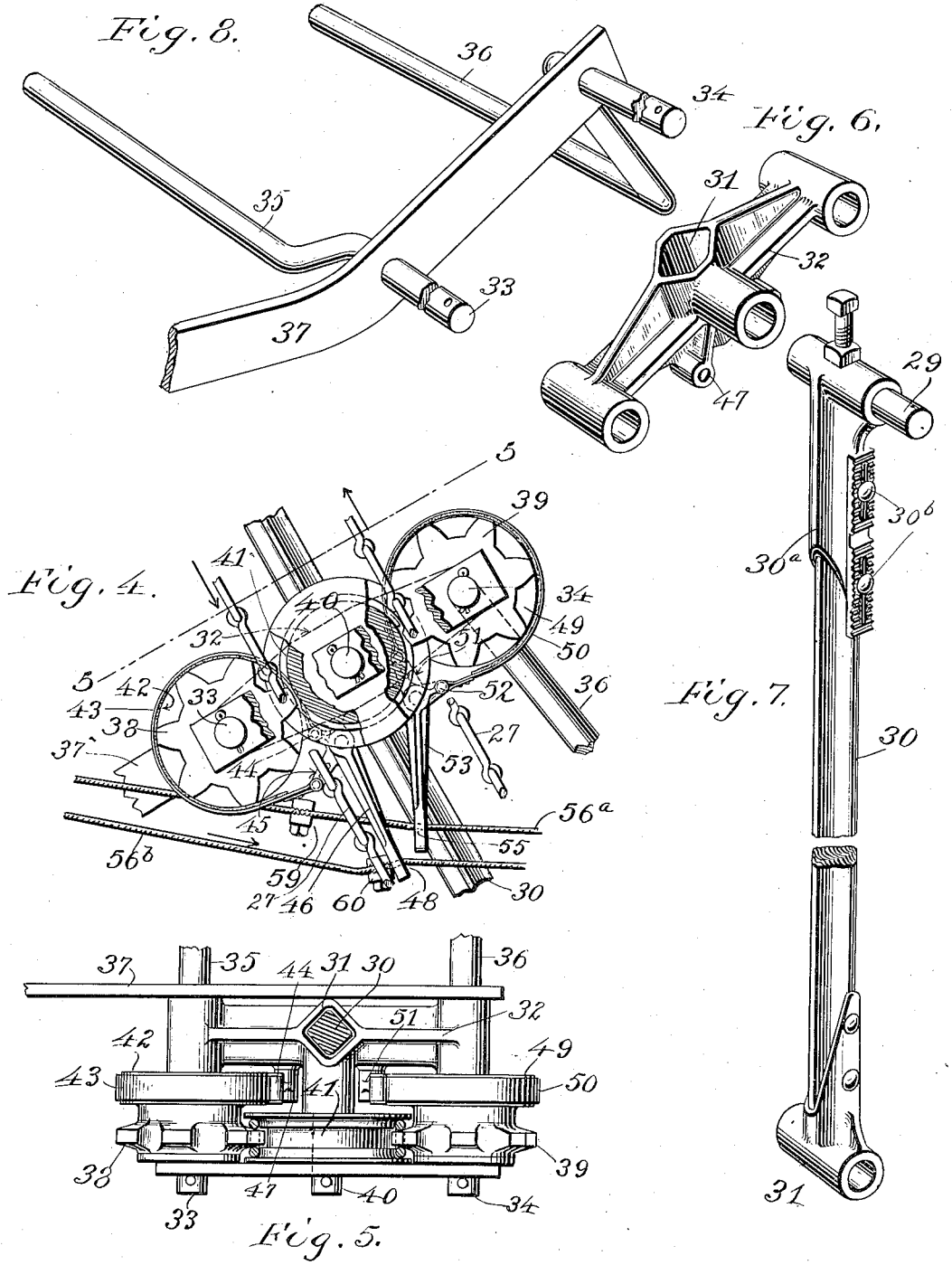

UNITED STATES PATENT OFFICE.

ORBIN F. SMITH AND ALEXUS C. LINDGREN, OF MOLINE, ILLINOIS, ASSIGNORS TO MOLINE PLOW COMPANY, A CORPORATION OF ILLINOIS.

PLOW-ADJUSTING MECHANISM.

1,103,543.      Specification of Letters Patent.   Patented July 14, 1914.

Application filed November 14, 1912. Serial No. 731,356.

*To all whom it may concern:*

Be it known that we, ORBIN F. SMITH and ALEXUS C. LINDGREN, both citizens of the United States, residing at Moline, in the county of Rock Island and State of Illinois, have invented certain new and useful Improvements in Plow-Adjusting Mechanism, of which the following is a specification, reference being had therein to the accompanying drawing.

This invention relates to wheeled plows, one of the objects of the invention being to provide a mechanism for adjusting the plow with reference to the ground, which mechanism will be power-operated, as for instance by the traveling motion of the plow through the field.

The invention is designed for use more particularly in connection with gang plows in which the weight to be lifted is considerable, and is of special utility and advantage in connection with traction drawn plows employed for the cultivation of extensive areas, and in which a series of gang plows are coupled to a traction engine by which they are drawn through the field. In operating a series of plows arranged in this manner, it has been customary in adjusting the individual plows so as to vary the depth of plowing, or to raise and lower the plows, to employ an attendant for each plow.

Another object of our invention, therefore, is to provide for the control of the plow adjusting mechanism from a common point removed or distant from the plows, to the end that a single attendant stationed at a point distant from the several plows of the series, for instance, the engineer or attendant controlling the traction engine, will be enabled to alone adjust the different plows of the series at will.

We propose in accordance with our invention, in accomplishing the above-mentioned objects, to provide each plow of the series with an improved form of adjusting mechanism adapted to be operated in an improved manner by power means derived preferably from the travel of the plow through the field, suitable controlling devices for the several adjusting mechanisms being employed to throw the power means into action, which controlling devices are adapted to be operated by a single attendant.

From the foregoing it will be understood that our invention comprehends two features; first, the provision of power-actuated plow-adjusting mechanism, which is applicable to a single as well as a series of plows; and second, the control of the adjusting mechanism of a series of plows from a common point, and this whether the adjusting means is power-actuated or is operated by hand.

In the accompanying drawings: Figure 1 is a side elevation of a gang plow having our invention embodied therein, the plows being shown lowered in action. Fig. 2 is a similar view with the plows raised out of action. Fig. 3 is a top plan view of the plow. Fig. 4 is a fragmentary view in elevation, on an enlarged scale, showing the controlling devices for the power-actuated mechanism. Fig. 5 is a horizontal sectional plan view on the line 5—5 of the preceding figure. Figs. 6, 7 and 8 are perspective views of details. Fig. 9 is a view in the nature of a diagram, showing the application of our invention to a series of tractor-drawn plows.

As shown more particularly in Figs. 1, 2, and 3, the gang plow to which our invention is applied, comprises a frame 1 consisting of a series of plow beams rigidly connected together and giving rigid support to a series of moldboard plows 2, 3, 4 and 5. Mounted loosely in bearings 7, 7, on the frame, only one of which bearings is indicated, is a horizontal transversely-extending rock shaft 8, which is extended downwardly and forwardly at one end, at the land side of the frame in the form of a crank arm 9, the lower end of which is provided with a horizontal wheel spindle 10, on which a land wheel 11 is mounted to rotate. Forward of this rock shaft the frame of the machine is provided with bearings 12, 12, in which is mounted a second horizontal transverse rock shaft 13, one end of which is extended downwardly and forwardly at the furrow side of the frame, in the form of a crank arm 14, which is provided on its end with a horizontal wheel spindle 15 on which a furrow wheel 16 is loosely mounted. From this description it will be seen that by rocking the shafts 8 and 13, the land and furrow wheels will be shifted back and forth with reference to the frame, and will cause the frame to be raised from the ground to elevate the plows if the wheels are shifted to the rear, or will cause the frame to be depressed and lower the plows if the wheels are shifted forwardly.

Mounted loosely at its lower end on the rock shaft 8 is a hand lever 17, which is extended downwardly beyond the shaft in the form of an arm 18, having jointed to its lower end the rear end of a horizontal link 19, whose forward end is jointed to the lower end of an arm 20, fixed at its upper end to the rock shaft 13. The lever 17 is provided with a locking latch or dog 21, acted on by a spring 21ª, and adapted to engage in notches in a segment frame 22, fixed to the frame of the machine, by which means the lever may be locked in its adjusted position. Adjacent the lever 17 is arranged a second and shorter lever 23, which is fixed at its lower end to the rock shaft 8, and is provided with a locking dog 24, adapted to engage in notches in a segment frame 25, fixed to the said lever 17; whereby the lever 23 may be held in its adjusted position. From this description it will be seen that when lever 17 is moved, after its dog is first released, it will carry lever 23 with it, and will by this means shift rock shaft 8 to which lever 23 is fixed, and will thereby adjust the land wheel, while at the same time the furrow wheel will be correspondingly adjusted, by reason of the link connection 19 between arms 18 and 20, fixed respectively to lever 17 and the furrow wheel rock shaft 13. By means of this mechanism, it is also possible to adjust the land wheel independently of and in relation to the furrow wheel, which adjustment may be effected by the short lever 23.

The construction above described constitutes a manually-operated means for raising and lowering the plows and for varying the depth of cut, and except in so far as hereinafter indicated, and except in so far as this mechanism coöperates with our improved devices, it forms no part of the present invention.

In applying our invention to a plow-adjusting mechanism of this construction, the rotary motion of the land wheel in the forward travel of the machine is caused, preferably through the medium of a sprocket chain driven by the land wheel, to act on the frame of the machine in such manner as to cause the frame to rise with reference to the ground, and thus elevate the plow, in one coöperative relation of the chain and frame; and to cause the frame to descend and thus lower the plows in another coöperative relation of the chain and frame. To effect this operation of the parts, a sprocket wheel 26 is mounted loosely on the land wheel spindle 10, at the inner side of the land wheel, and has its hub formed with clutch teeth 26ª, adapted to coöperate with similar clutch teeth on the hub of the land wheel, in such manner that the forward motion of the land wheel will drive the sprocket wheel in the same direction, but will not rotate the sprocket wheel when the plow moves rearwardly. A sprocket chain 27 passes around the sprocket wheel 26 and extends upwardly and around an idler sprocket wheel 28, mounted loosely on a horizontal stud 29, fixed to the upper end of a bar 30, whose lower end has fixed to it a sleeve 31 loosely encircling the land wheel spindle at the inner side of the sprocket wheel 26. The two sprocket wheels thus mounted at a fixed distance from each other will maintain the chain under uniform tension, but in order that the wheels may be adjusted to or from each other to vary the tension of the chain, according to the conditions which may be encountered in practice, the upper extremity of the bar 30 is in the form of a hollow section 30ª, telescoped on the main portion of the bar, the two being connected together adjustably by means of fastening bolts 30ᵇ, 30ᵇ, extending outwardly from the main portion of the bar and through longitudinal slots in the section 30ª. The bar 30 is rectangular in cross-section, and being supported at its lower end on the land wheel spindle, it will be moved bodily endwise up and down with reference to the frame of the machine when the land wheel spindle is shifted in the plow adjusting operation, the said bar in such movement sliding through an opening 31 in a block or casting 32, supported fixedly in an inclined position on the outer horizontal ends 33 and 34 of two transverse bracket arms 35 and 36, the opening 31 being of sufficient size to permit the bar to tilt in its movements therethrough. These bracket arms are mounted on the frame of the machine in castings or blocks 35ª and 36ª respectively, fixed to the frame, the bracket arms being sustained fixedly in relation thereto by means of a bar 37, fixed at its forward end to the frame, and perforated at its rear end to receive the horizontal ends of the bracket arms, as shown more particularly in Fig. 8. The ends 33 and 34 of the bracket arms are extended outwardly beyond the casting 32 in the form of spindles, and have loosely mounted on them, two sprocket wheels, a sprocket wheel 38 on the forward spindle 33, and a sprocket wheel 39 on the rear spindle 34, which wheels are in such position relative to the chain that the latter will engage the sprocket teeth and drive the wheels. Between the two sprocket wheels 38 and 39 the casting 32 is provided with a horizontal projecting stud 40, on which is loosely mounted a wheel 41, whose peripheral surface is grooved, as shown more particularly in Fig. 5, in such manner that the opposite sides of the sprocket chain will be received in the grooves at diametrically opposite sides of the wheel, and will in this manner be maintained in engagement with the respective wheels 38 and 39.

The hub of sprocket wheel 38 has formed on its inner end a brake wheel 42, which is embraced by a brake band 43, the ends of which are jointed respectively to arms 44 and 45, extending angularly from a brake band lever 46, pivoted as at 47 to the casting 32. This lever is extended downwardly and is provided with an opening 48, the purpose of which will presently appear. The hub of the other sprocket wheel 39 is likewise provided on its inner end with a brake wheel 49, encircled by a brake band 50, having its ends jointed respectively to two arms 51 and 52, extending angularly from a brake band lever 53, pivoted as at 54 to the casting 32. This lever, like the lever 46, is extended downwardly and provided with a hole 55. The form of the brake bands and the relation of the angular arms to the same and to the points of pivotal connection of the two levers are such that normally the bands will extend loosely around the brake wheels out of frictional engagement therewith, and will not interfere with their free movements; but when the levers are swung rearwardly, the brake bands will be tightened around the respective brake wheels and will hold them, and consequently the sprocket wheels 38 and 39, fixedly against rotation. By the independent operation of these levers, therefore, it is possible to arrest the motion of one of the sprocket wheels while the other is allowed to rotate, and to accomplish this result we provide a cable or cord 56, which is passed at its rear around a guide sheave 57, mounted in a sheave-carrying arm 58, pivoted as at 59, to a fixed part of the frame. From this guide sheave the cable is extended forwardly, its upper side 56ª passing through the hole in the brake band lever 53, and its lower side 56ᵇ extending through the hole in the brake band lever 46, operating lugs or knots 59 and 60 being fixed to the upper and lower sides respectively of the cable in advance of the levers, and adapted to respectively engage these levers. From this it is seen that if the upper side 56 of the cable is pulled forwardly, the lower side will be moved to the rear, and the knot 60 will engage lever 46, and the latter will be swung to the rear, which action, by tightening brake band 43 on brake wheel 42, will hold this wheel, and consequently sprocket wheel 38, against rotation. Simultaneously with this action, knot 59 on the upper side of the cable will be drawn forward free of the other brake band lever 53, and the brake band connected with this lever being free to assume its normal condition, it will not exert any braking action on the brake wheel, and consequently sprocket wheel 39 will be free to rotate. When the lower side of the cable is pulled forwardly, knot 59 will be brought into engagement with brake band lever 53, and knot 60 at the same time will be moved forward free of brake band lever 46, with the result that the brake wheel 49 will be held against rotation, and the other sprocket wheel will be left free to rotate.

The foregoing operations of the cable, by arresting the motion of one or the other of the two sprocket wheels 38 and 39, causes the arrested sprocket wheel to act in effect as a fixed part of the frame for the time being, and the moving sprocket chain under the influence of the forward travel of the land wheel, by engaging with the fixed sprocket wheel will positively shift the frame of the machine up or down in reference to the swinging crank arms 9 and 14 which carry the land and furrow wheels, according to which particular sprocket wheel is held, the upward movement of the frame elevating the plows, and the downward movement of the frame lowering the plows. It is seen, therefore, that the operating cable and the two brake mechanisms form in effect controlling devices which operate to throw the power means into action in effecting the adjustment of the plows.

The operation of the mechanism so far described is as follows: Assuming that the plow frame is in lowered position, with the plows in action as shown in Fig. 1, and it is desired to elevate the same by the power mechanism. In this position of the parts both of the brake bands are supposed to be in their normal relaxed condition, permitting the sprocket wheels to rotate freely as they are engaged by the sprocket chain in the forward travel of the machine, the forward side of the chain moving downwardly and the rear side of the chain moving upwardly. Lifting lever 23 is locked by its latch to the segment frame on lever 17, and the latter lever is locked to segment frame 22, with the result that the plows are locked down in action fixedly. To raise the plows, lever 17 must first be released by disengaging its dog 21 from the fixed segment frame. This release is accomplished automatically by the cable when the latter is pulled forward to throw the power means into action, the pivoted sheave-carrying arm 58 being connected to dog 21 by means of a rod 61 pivoted at its lower end to the sheave-carrying arm, as at 61ª, and pivoted at its upper end to the dog 21 as at 62, the construction being such that the tension that the sheave will be subjected to in the operation of the cable, will draw the sheave and its carrying arm forwardly, and this action, through the medium of rod 61, will lift dog 21 from engagement with the teeth of the segment frame, and thereby release the lever. To raise the plows, therefore, the attendant pulls forwardly on the lower side 56ᵇ of the cable, which action will carry knot 59 on the upper side of the cable into engagement with brake band lever 53, and will apply sufficient tension to the sheave-carrying arm 58 to shift the same forward and thereby unlatch dog 21 of lever 17. The continued pull on the cable after the latch has been thus released, will swing brake band lever 53 to the rear, and the brake band being tightened on the wheel, will arrest the motion of sprocket wheel 39. The upwardly moving rear side of the sprocket chain now acts on the fixedly held sprocket wheel 39 and positively lifts the frame and plows relatively to the ground wheels, the two hand levers 17 and 23 at the same time swinging forwardly. On the release of the cable, the tension being removed from the sheave-carrying arm, the latter will be swung back to its former position by the action of the spring 21ᵃ of dog 21, and the dog seating in one of the notches of the segment frame 22, the plows will be locked in elevated position. Simultaneously with the above-mentioned action, brake band lever 53 is freed from the engagement of its operating knot 59, with the result that sprocket wheel 39 will be again released and allowed to rotate freely with the other sprocket wheel as the machine continues its forward travel. It is seen, therefore, that by the operation of the controlling devices, the power means are thrown into action and serve to operate the plow-adjusting mechanism. In lowering the plow, the operator pulls forwardly on the upper side 56ᵃ of the cable, thereby bringing knot 60 into engagement with brake band lever 46, and by this action unlocking lever 17 and swinging brake band lever 46 to the rear. By this action the forward sprocket wheel 38 will be held against rotation, and the forward downwardly moving side of the chain acting on the fixed sprocket, which for the time being forms in effect a part of the frame, will positively pull the frame down with reference to the wheels, and will thereby lower the plows into action. When the proper depth has been obtained, the cable is released, with the result that the brake band 43 will relax, and sprocket wheel 38 be left free to rotate, and dog 21 permitted to lock lever 17 in position with the plows in the ground. More or less raising or lowering movement may be given to the frame by the proper manipulation of the cable, so that the plows may be conveniently adjusted to the exact depth of cut required.

From the foregoing description it will be seen that the elevation and depression of the plows is performed by the draft power applied to draw the plow over the field, such power acting through the rotation of the land wheel.

In the foregoing description we have set forth the application of our improved mechanism to a single gang-plow adapted to be drawn by a tractor, and provided with a platform at its front, on which the operator stands. In such a case the controlling cable would be extended to this platform, as shown, so as to be within reach of the operator. In other forms of plows, for instance those drawn by draft animals, the cable would be extended within reach of the driver.

As shown diagrammatically in Fig. 9, we have illustrated our invention applied to a series of gang plows A, B, C, coupled to a tractor D, by which the plows are drawn over the field in a group. In this case the operator standing on a platform E, or other support at the front of the series of plows where he can control the tractor, will be enabled to also control the adjusting mechanisms of the several plows of the series, and for this purpose the controlling cables for the adjusting mechanisms F, G and H of the respective plows A, B, C, are extended forwardly to the platform E where they may be manipulated by the operator or attendant. It will be seen, therefore, that means are thus provided for operating the adjusting mechanisms of a series of plows from a common point distant from the plows, and we desire it to be understood that this feature of our invention is not limited to the particular form of adjusting mechanism for the individual plows shown, but is applicable as well to other forms of adjusting mechanisms, provided that such mechanisms can be controlled from a common point as described.

Further, we wish it to be understood that our improved power-actuated mechanism is applicable to single plows, although by reason of the character of the controlling devices for throwing the actuating means into action, it is particularly adaptable to a series of tractor-drawn plows, as shown in Fig. 9.

In the particular arrangement of the coupled plows shown in Fig. 9, the forward plow C is supported at its front by its connection with the tractor. The next plow B is supported at its front by a draft truck K to which the plow is connected and which truck is in turn coupled to the tractor; while the rearmost plow A is supported at its front by a draft truck L to which it is connected, and which truck in turn is coupled to the truck K, the several plows being maintained in proper spaced relations transversely, and being flexibly connected by links M and N, the link M jointed to the front plow and to the truck K, and the link N jointed to the plow B and truck L.

Having thus described our invention, what we claim is:—

1. In combination with a plow frame, a plowing device carried thereby and movable up and down, a means operated by the travel of the plow and comprising oppositely-moving portions, and means for effecting operative connection between the plowing device and either of said moving portions.

2. In a plow and in combination with a plow frame, a plowing device carried thereby and movable up and down, a member moving in opposite directions on opposite sides and operated by the travel of the plow, and means for effecting operative connection between the plowing device and either side of said member at will.

3. In a plow and in combination with the plow frame, a plowing device carried thereby and movable up and down, an endless sprocket chain operated by the travel of the plow and traveling in opposite directions on opposite sides, and means for effecting operative connection between the plowing device and either side of the chain at will.

4. In a plow and in combination with the frame, a plowing device carried thereby and movable up and down, an endless sprocket chain driven by power derived from the travel of the plow, and means for effecting operative connection at will between the opposite leads of the chain and the plowing device; whereby the plowing device will be moved by the chain to raise and lower the same.

5. In a wheeled plow and in combination with supporting wheels, a plowing device movable up and down relatively to the wheels, an upright endless sprocket chain driven by one of the supporting wheels and in relation to which chain the plowing device is movable in the direction of travel of the chain, and means for effecting operative connection at will between the plowing device and the stretch of the sprocket chain.

6. In a wheeled plow and in combination with a supporting wheel, a plowing device movable up and down in relation thereto, sprocket wheels mounted at a fixed distance from each other on upright supports, in relation to which supports the plowing device is movable up and down, one of the sprocket wheels being driven from the supporting wheel, an endless sprocket chain passing around said sprocket wheels, and means for effecting operative connection between the plowing device and the stretch of said chain.

7. In a wheeled plow and in combination with a supporting wheel, a plowing device movable up and down in relation thereto, upper and lower sprocket wheels mounted at a fixed distance from each other on supports, in relation to which supports the plowing device is movable, the lower sprocket wheel being driven from the supporting wheel, an upright endless sprocket chain passing around said sprocket wheels, and means for effecting operative connection between the plowing device and either stretch of the chain as desired.

8. In a wheeled plow and in combination with a supporting wheel, a plowing device movable up and down in relation thereto, sprocket wheels mounted at a fixed distance from each other on supports, in relation to which supports the plowing device is movable, one of the sprocket wheels being driven by the supporting wheel, a sprocket chain passing around said sprocket wheels, a third sprocket wheel mounted on a support movable up and down with the plowing device in position to be rotated by the sprocket chain, and means for applying a braking action to the third sprocket wheel at will.

9. In a wheeled plow and in combination with a supporting wheel, a plowing device movable up and down in relation thereto, sprocket wheels mounted on spaced supports in relation to which supports the plowing device is movable, one of the sprocket wheels being driven by said supporting wheel, a sprocket chain passing around said sprocket wheels, sprocket wheels on opposite sides of the chain and mounted on supports movable up and down with the plowing device, said last-mentioned sprocket wheels being rotated by the sprocket chain, and means for applying a braking action to the motion of either of the last-mentioned sprocket wheels at will.

10. In a wheeled plow and in combination with a supporting wheel, a plowing device movable up and down in relation thereto, sprocket wheels mounted at a fixed distance from each other on supports, in relation to which supports the plowing device is movable, one of the sprocket wheels being driven by the supporting wheel, a sprocket chain passing around said sprocket wheels, a third sprocket wheel mounted on a support movable up and down with the plowing device in position to be rotated by the sprocket chain, and means for arresting the motion of the third sprocket wheel at will.

11. In a wheeled plow and in combination with a supporting wheel, a plowing device movable up and down in relation thereto, sprocket wheels mounted on spaced supports in relation to which supports the plowing device is movable, one of the sprocket wheels being driven by said supporting wheel, a sprocket chain passing around said sprocket wheels, sprocket wheels on opposite sides of the chain and mounted on supports movable up and down with the plowing device, said last-mentioned sprocket wheels being rotated by the sprocket chain, and means for arresting the motion of either of the last-mentioned sprocket wheels at will.

12. In a wheeled plow, the combination of a frame, a plowing device carried thereby, a swinging crank arm mounted on the frame, a ground wheel carried by said arm, sprocket-wheel supports sustained by said swinging arm, sprocket wheels mounted on said supports respectively, means for driving one of the sprocket wheels from the ground wheel, a chain passing around said sprocket wheels, a third sprocket wheel sustained by the frame in position to be engaged by the sprocket chain, and means for holding said third sprocket wheel fixedly against motion-at-will.

13. In a wheeled plow, the combination of a frame, a plowing device carried thereby, swinging crank arms mounted on the frame, operative connections between the arms to cause them to move in unison, land and furrow wheels carried respectively by said arms, sprocket-wheel supports sustained by the land wheel arm, sprocket wheels mounted on said supports respectively, means for driving one of the sprocket wheels from the land wheel, a chain passing around said sprocket wheels, a third sprocket wheel sustained by the frame in position to be engaged by the sprocket chain, and means for holding said third sprocket wheel fixedly against motion at will.

14. In a wheeled plow, the combination of a frame, a plowing device carried thereby, a swinging crank arm mounted on the frame, a ground wheel carried by said arm, a sprocket wheel on said arm in position to be driven by the ground wheel, an upright bar sustained by the arm, a sprocket wheel mounted on said bar, a sprocket chain passing around said sprocket wheels, a third sprocket wheel mounted on the frame in position to be engaged and rotated by the sprocket chain, and means for holding said third sprocket wheel against rotation.

15. The combination of a frame, a plowing device carried thereby and movable up and down, an endless sprocket chain, means for driving the same, a sprocket wheel movable bodily up and down with the plowing device and mounted in position to be engaged and rotated by the chain, a brake wheel connected with said sprocket wheel, a brake coöperating with the brake wheel, and means for operating the brake.

16. The combination of a frame, a plowing device carried thereby and movable up and down, an endless sprocket chain, means for driving the same, a sprocket wheel movable bodily up and down with the plowing device and mounted in position to be engaged and rotated by the chain, a brake wheel connected with said sprocket wheel, a brake coöperating with the brake wheel, an operating lever connected with the brake, and a cable or cord for operating the lever.

17. The combination of a frame, a plowing device carried thereby and movable up and down, an endless sprocket chain, means for driving the same, sprocket wheels in position to be engaged and rotated respectively by the opposite stretches of the chain, said wheels being movable bodily up and down with the plowing device, brake wheels connected with the respective sprocket wheels, brakes coöperating with the brake wheels, levers connected with the brakes, and a cable or cord adapted to operate the levers.

18. The combination of a frame, a plowing device carried thereby and adjustable up and down, locking means for holding the plowing device in its adjusted position, an endless sprocket chain, means for driving the same, sprocket wheels in position to be engaged and rotated respectively by the opposite stretches of the chain, said wheels being movable bodily up and down with the plowing device, brake wheels connected with the sprocket wheels, brakes coöperating with the brake wheels, a cable for operating the brakes, and operative connections between the cable and the locking means for the plowing device, said connections being such as to automatically release the locking means when the cable is operated.

In testimony whereof we affix our signatures in presence of two witnesses.

ORBIN F. SMITH.
ALEXUS C. LINDGREN.

Witnesses:
L. C. BLANDING,
JAMES J. LAMB.